United States Patent
Huang

(10) Patent No.: US 8,607,318 B2
(45) Date of Patent: Dec. 10, 2013

(54) SLAVE DEVICE FOR A BLUETOOTH SYSTEM AND RELATED AUTHENTICATION METHOD

(75) Inventor: Jia-Bin Huang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 216 days.

(21) Appl. No.: 13/045,538

(22) Filed: Mar. 11, 2011

(65) Prior Publication Data

US 2011/0307945 A1 Dec. 15, 2011

(30) Foreign Application Priority Data

Jun. 14, 2010 (TW) ................ 99119306 A

(51) Int. Cl.
*H04L 29/06* (2006.01)

(52) U.S. Cl.
USPC ............... 726/6; 726/5; 380/270; 709/225; 709/227; 455/41.1; 455/41.2

(58) Field of Classification Search
USPC ............... 726/5, 6; 380/270; 709/225, 227; 455/41.1, 41.2
See application file for complete search history.

(56) References Cited

U.S. PATENT DOCUMENTS

| 6,032,207 | A * | 2/2000 | Wilson ........................... 710/54 |
| 6,829,288 | B2 * | 12/2004 | Orava ........................... 375/132 |
| 2006/0135065 | A1* | 6/2006 | Lee et al. ..................... 455/41.1 |
| 2007/0155326 | A1* | 7/2007 | Lin et al. ...................... 455/41.2 |
| 2008/0280559 | A1* | 11/2008 | Dandekar et al. ............ 455/41.2 |
| 2009/0037743 | A1* | 2/2009 | Narayanaswami .......... 713/186 |
| 2009/0174525 | A1* | 7/2009 | Yamauchi ..................... 340/5.8 |
| 2010/0235525 | A1* | 9/2010 | McGuire et al. .............. 709/228 |
| 2010/0255783 | A1* | 10/2010 | Kim .............................. 455/41.2 |
| 2011/0063103 | A1* | 3/2011 | Lee et al. ...................... 340/505 |
| 2011/0320535 | A1* | 12/2011 | Donaldson .................... 709/204 |
| 2012/0083209 | A1* | 4/2012 | Giles et al. ................... 455/41.2 |
| 2012/0117637 | A1* | 5/2012 | Little et al. ....................... 726/9 |
| 2012/0238216 | A1* | 9/2012 | Hallowell et al. ............ 455/41.3 |
| 2012/0282860 | A1* | 11/2012 | Sasai et al. ................... 455/41.3 |
| 2013/0095762 | A1* | 4/2013 | Inagaki et al. ............... 455/41.2 |

* cited by examiner

*Primary Examiner* — Nathan Flynn
*Assistant Examiner* — Sarah Su
(74) *Attorney, Agent, or Firm* — Winston Hsu; Scott Margo

(57) ABSTRACT

An active slave device for a Bluetooth system comprises a non-volatile memory unit for storing a plurality of link keys corresponding to a master device capable of switching among a plurality of operating modes, wherein the plurality of link keys correspond to the plurality of operating modes and are generated by a key pairing performed between the active slave device and the master device; and a key fishing unit for searching whether any of the plurality of link keys conforms to a qualified link key that can enable the active slave device under the current operating mode of the master device.

26 Claims, 8 Drawing Sheets

| Pairing Bluetooth address | Link key | Used cnt | Valid |
|---|---|---|---|
| BTA | LKS(1) | 1 | ○ |
| | LKS(2) | 2 | ○ |
| | ... | ... | ... |
| | LKS(n) | 0 | × |

FIG. 3

SLAVE DEVICE FOR A BLUETOOTH SYSTEM AND RELATED AUTHENTICATION METHOD

BACKGROUND OF THE INVENTION

1. Field of the Invention

The present invention relates to an authentication method and related device, and more particularly, to a method for performing authentication with a master device equipped with multiple operating systems in a Bluetooth system and related slave device.

2. Description of the Prior Art

Bluetooth system is a wireless short distance system with a piconet as the smallest network unit. The Bluetooth system utilizes time division duplex technology to allow a master device to transmit messages with at most seven active slave devices mutually. For data security and secrecy, an authentication procedure which is executed between the master device and the active slave devices is established on a challenge-response mechanism. The authentication end transmits a random number (regarded as a [challenge]) to the demand end, and the demand end utilizes the random number, a link key of the demand end and some other parameters to calculate a [response] and then transmits the [response] back to the authentication end. Further, the authentication end also utilizes the random number, a link key of the authentication end and some other parameters to calculate a result with the same algorithm as used by the demand end. If the result is the same as the [response], it represents that the authentication succeeds. From the above, the authentication procedure is successful when the authentication end and the demand end have the same content of the link key. The master device and the active slave device both can be authentication end or demand end. Further, the master device and the active slave device authenticate with each other by playing the role of the authentication end in turn.

Please refer to FIG. 1, which illustrates a schematic diagram of a traditional Bluetooth system 10. In Bluetooth system 10, a host 100 can be devices such as a desktop computer, a laptop, a mobile communication device, etc and includes operating systems OS(1)-OS(n) and link keys LK(1)-LK(n) corresponding to the operating systems OS(1)-OS(n). The host 100 cannot access the link keys corresponding to the other operating systems when the host 100 is operated on one of the operating systems. A master device 110 can be a Bluetooth peripheral dangle such as a Bluetooth mouse, a earphone, an amplifier, etc and use a host controller interface (HCI), such as a universal serial bus (USB) interface, to exchange Bluetooth messages and commands with the host 100. Further, the HCI can be a Bluetooth wireless interface to communicate with Bluetooth peripheral devices of the host 100. In the Bluetooth system 10, an active slave device 120 can be regarded as the Bluetooth peripheral of the host 100, for example a Bluetooth mouse, a Bluetooth earphone, a Bluetooth amplifier, etc. The master device 110 utilizes a Bluetooth address BTA to establish an asynchronous connection-less (ACL) connection with the active slave device 120. After the connection establishment finishes, the master device 110 and the active slave device 120 have to execute an authentication procedure with each other. A key pairing procedure is executed to produce a new link key when any of the master device 110 and the active slave device 110 has no link key for authentication or the link key is invalid. In the active slave device 120, a non-volatile memory unit 122 stores the paired link key, i.e. the link key LKP, which corresponds to the Bluetooth address BTA with a "valid pointer" field for determining whether the link key LKP is valid. The active slave device 120 utilizes the link key LKP and the master device 110 utilizes the link key corresponding to the currently-used operating system operated by the host 100 to authenticate with each other. For example, the master device 110 obtains the link key LK(n) from the host 100 via the host controller interface to authenticate the active slave device 120 with the link key LKP when the host 100 is operated with the operating system OS(n).

In the Bluetooth system 10, the active slave device 120 is designed to store only one link key. Therefore, the old link key in the non-volatile memory unit 122 is replaced with a new link key each time when the new link key is produced by the key pairing procedure between the master device 110 and the active slave device 120 produces. However, each time when the host 100 with multiple operating systems reboots, the link key is always being replaced. In this situation, the master 110 and the active slave device 120 always authenticate failed with each other after the host changes the operating system and thereby need to re-pair the link key. For example, the host 100 operated in the operating system OS(1) communicates with the active slave device 120 for authenticated Bluetooth communication through the master device 110. In this situation, the master device 110 utilizes the link key LK(1) whose content is the same as content of the link key LKP of the non-volatile memory 122. Afterward, when the host 100 is rebooted and operated in the operating system OS(2), the master device 110 and the active slave device 120 must re-establish the connection and authenticate with each other. In this situation, the master device 110 obtains the link key LK(2) from the host 100, and the active slave device 120 obtains the link key LKP with the same content as the link key LK(1) for authenticating with each other. Because of different link key contents used by the master device 110 and the active slave device 120, the authentication procedure is failed and thereby causes the master device 110 and active slave device 120 to re-pair the link key. However, the key pairing procedure takes time and Bluetooth wireless resources.

SUMMARY OF THE INVENTION

It is thereof an objective of the present invention to provide an active slave device for a Bluetooth system and related authentication method thereof to solve the problem that when the master device equipped with multiple operating systems changes the operating system, the link key should be updated accordingly.

The present invention discloses an active slave device for a Bluetooth system. The active slave device comprises a non-volatile memory unit for storing a plurality of link keys corresponding to a master device capable of switching among a plurality of operating modes, wherein the plurality of link keys correspond to the plurality of operating modes and are generated by a key pairing procedure performed between the active slave device and the master device; and a key fishing unit for searching whether any of the plurality of link keys conforms to a qualified link key that can enable the active slave device under the current operating mode of the master device.

The present invention discloses an authentication method for an active slave device of a Bluetooth system. The authentication method comprises storing a plurality of link keys corresponding to a master device in a non-volatile memory unit of the active slave device that the master device is capable of switching among a plurality of operating modes, wherein the plurality of link keys correspond to the plurality of operating modes and are generated by a key pairing procedure performed between the active slave device and the master device; and searching whether any of the plurality of link keys conforms to a qualified link key that can enable the active slave device under the current operating mode of the master device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a store format of the non-volatile memory unit shown on FIG. 2.

DETAILED DESCRIPTION

Figure 1:
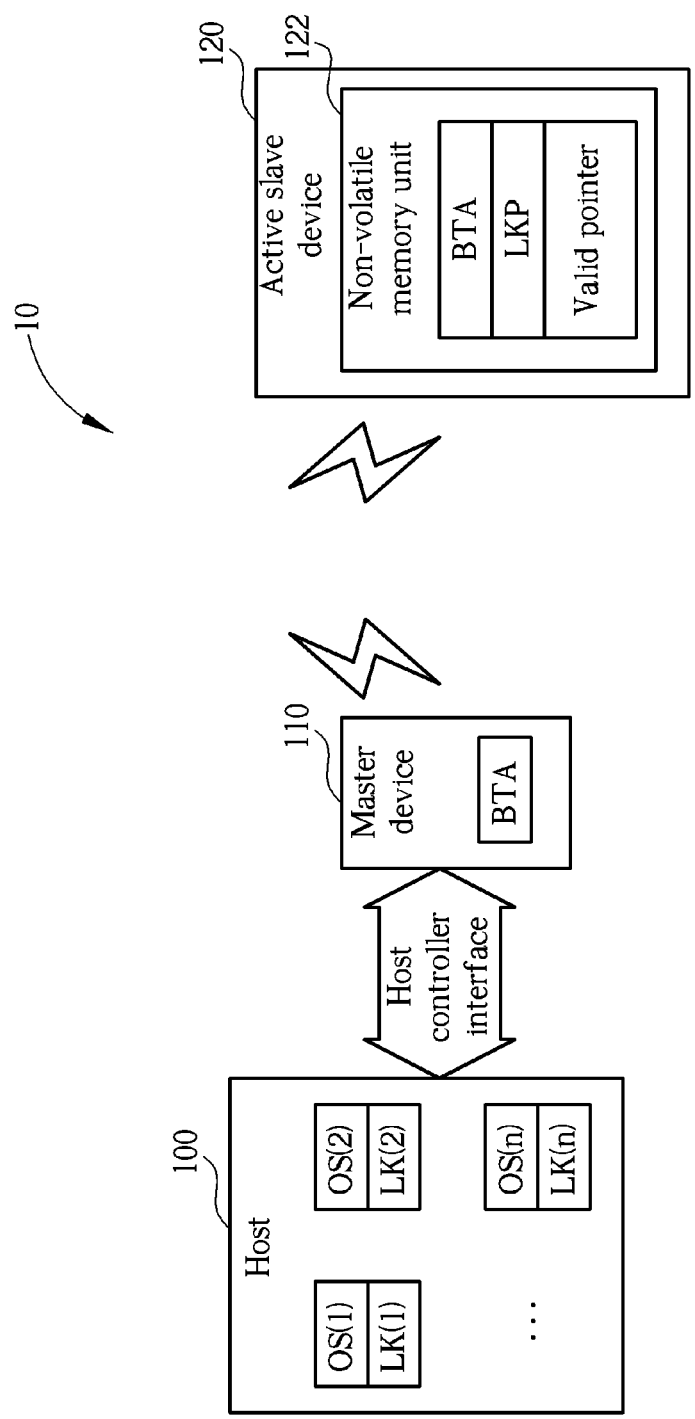
FIG. 1 is a schematic diagram of a traditional Bluetooth system.
Figure 2:
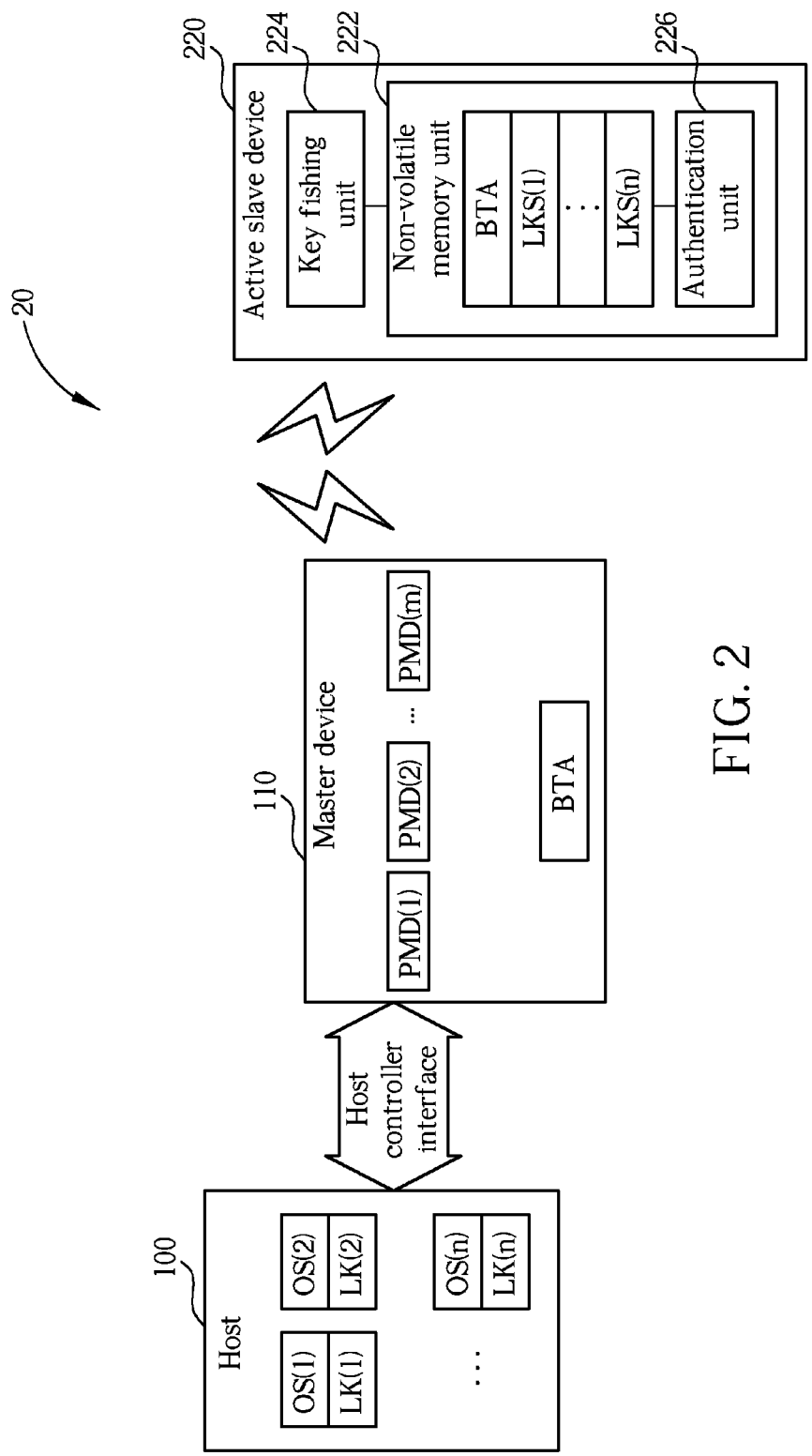
FIG. 2 is a schematic diagram of a Bluetooth system according to an example.

Please refer to FIG. 2, which illustrates a schematic diagram of a Bluetooth system 20 according to an embodiment of the present invention. The FIG. 2 is similar with the FIG. 1, and therefore the same symbols represent the same component. In the Bluetooth system 20, an active slave device 220 can be devices such as a Bluetooth mouse, a Bluetooth earphone, a Blue amplifier etc and includes a non-volatile memory unit 222, a key fishing unit 224 and an authentication unit 226. The non-volatile memory unit 222 can be the flash memory or electrically erasable programmable read only memory (EEPROM) and stores link keys LKS(1)-LKS(n) into the field corresponding to the Bluetooth address BTA, wherein each link key initially can be produced via a key pairing procedure. In addition, if the active slave device 220 and the master device 110 operated in the operating system OS(2) produce a new link key via the key pairing procedure, the active slave device 220 may replace one of the link keys LKS(1)-LKS(n) with the new link key. On the other hand, the master device 110 stores the new link key to a new link key LK(2). The key fishing unit 224 is used for searching whether a link key among the link keys LKS(1)-LKS(n) conforms to the link key used by the master device 110. Further, the link key used by the master device 110 may be different under the different operating modes (e.g. the operating modes PMD(1)-PMD(m) shown on FIG. 2) and depended on the operating system operated by the master device 110. For example, if the host 100 is operated in the operating system OS(n) and initiates an authentication procedure, the key fishing unit 224 searches whether a link key among the link keys LKS(1)-LKS (n) conforms to the link key LK(n). The initiation of the authentication procedure can be triggered by rebooting of the host 100. In all examples of the present invention, any link key found conforming to the link key currently used by the master device 110 is regarded as a qualified link key which can directly enable the active slave device under the current operating mode of the master device 110. In other words, the qualified link key allows the active slave device 220 to execute related security functions with the master device without a key pairing procedure used for re-producing a new link key (hereinafter an updating link key). Besides, searching priority sequence of the link keys LKS(1)-LKS(n) is not limited and also can be decided by auxiliary information, about which an example is described below. The authentication unit 226 is mainly used for executing an authentication procedure or a key pairing procedure with the master device 110. When the key fishing unit 224 indicates that the qualified link key is found among the link keys LKS(1)-LKS(n), namely when a link key conforms to the link key used by the master device 110, the authentication unit 226 utilizes the qualified link key to authenticate the master device 110 mutually. When the key fishing unit 224 indicates that no qualified link key is found, the authentication unit 226 and the master device 110 execute the key pairing procedure to produce the updating link key. Then, the authentication unit 226 utilizes the updating link key to authenticate the master device 110 mutually, and the non-volatile memory 222 stores the updating link key or replace one of the link keys LKS(1)-LKS(n) with the updating link key.

For example, the link keys LKS(1)-LKS(n) of the active slave device 220 pairs the link keys LKS(1)-LKS(n) of host 100 respectively. In other words, contents of the link keys LKS(1)-LKS(n) is the same as contents of the link keys LKS(1)-LKS(n) respectively. In this situation, the host 100 operated in the operation system OS(1) uses the master device 110 to execute the authenticated Bluetooth communication with the active slave device 120. It represents that the master device 110 and the active slave device 220 use the link key LK(1) and LKS(1) respectively. Afterwards, if the host 100 reboots and is operated in the operating system OS(2), the master device 110 must re-establish the connection with the active slave device 120 and then authenticate with each other. In this situation, the master device 110 obtains the link key LK(2) from the host 100. On the other hand, the key fishing unit 224 of the active slave device 120 searches the link keys LKS(1)-LKS(n) and finds that the link key LKS(2) conforms to the link key LK(2). In other words, the link key LKS(2) is the qualified link key. After the link key fishing is successful, the authentication unit 226 utilizes the link key LK(2) to execute further the authentication procedure with the master device 110.

From the above, the embodiment of the present invention can store multiple link keys produced from the key pairing procedure with different operation systems of the host 100. Each time when the authentication procedure initiates, the active slave device 220 can find the same link key (the qualified key) among the link keys as the link key used by the master device 110. Therefore, the method of reusing link key can eliminate the need of re-pairing link key after the host 100 reboots and changes the operating system.

In addition, the present invention can further store the auxiliary information about the link keys LKS(1)-LKS(n) in the non-volatile memory unit 222 to help the active slave device 220 to decide the searching priority sequence and the validity of the link keys LKS(1)-LKS(n). Take an example based on FIG. 3 which illustrates a schematic diagram of a storage format 30 of the non-volatile memory unit 222. The storage format 30 includes a "pairing Bluetooth address" field, a "link key" field, a "used cnt" ("used count") field and a "valid" field. The "pairing Bluetooth address" field is used for storing the Bluetooth devices that have ever been paired successfully, namely the Bluetooth address BTA of the master device 110 in the example. The "link key" field is used for storing the link keys LKS(1)-LKS(n) corresponding to the Bluetooth address BTA. The "valid" field represents whether the corresponded link key is valid and the default value of the corresponded link key is "invalid". When the "valid" fields show all the link keys are invalid, it represents that no qualified key exists and the active slave device 220 pairs with the master device 110 directly to produce the updating link key. The "used cnt" field represents the number of times corresponding link key has ever been involved with successful authentication. The initial default value of the "used cnt" field can be 0. The more times of the successful authentication with which a link key is involved means that a user prefers corresponding operating system in the host 100. On the contrary, the less times of the successful authentication means that the user less prefers corresponding operating system in the host 100. Thus, the key fishing unit 224 can have priority to select whether the link key with more counts of the successful authentication is the qualified link key. Besides, when the updating link key is produced by the key pairing procedure, if the store number of the link key is overloaded, the updating link key can have priority to replace the link key marked by "invalid" or the link key with less the successful authentication.

Please be noticed that, although FIG. 3 represents multiple link keys corresponding to a signal authentication object (i.e. the master device 110), this should not be construed as limiting the disclosure to the present invention. The storage format 30 may include multiple authentication objects and each authentication object can correspond to multiple link keys.

Figure 4:
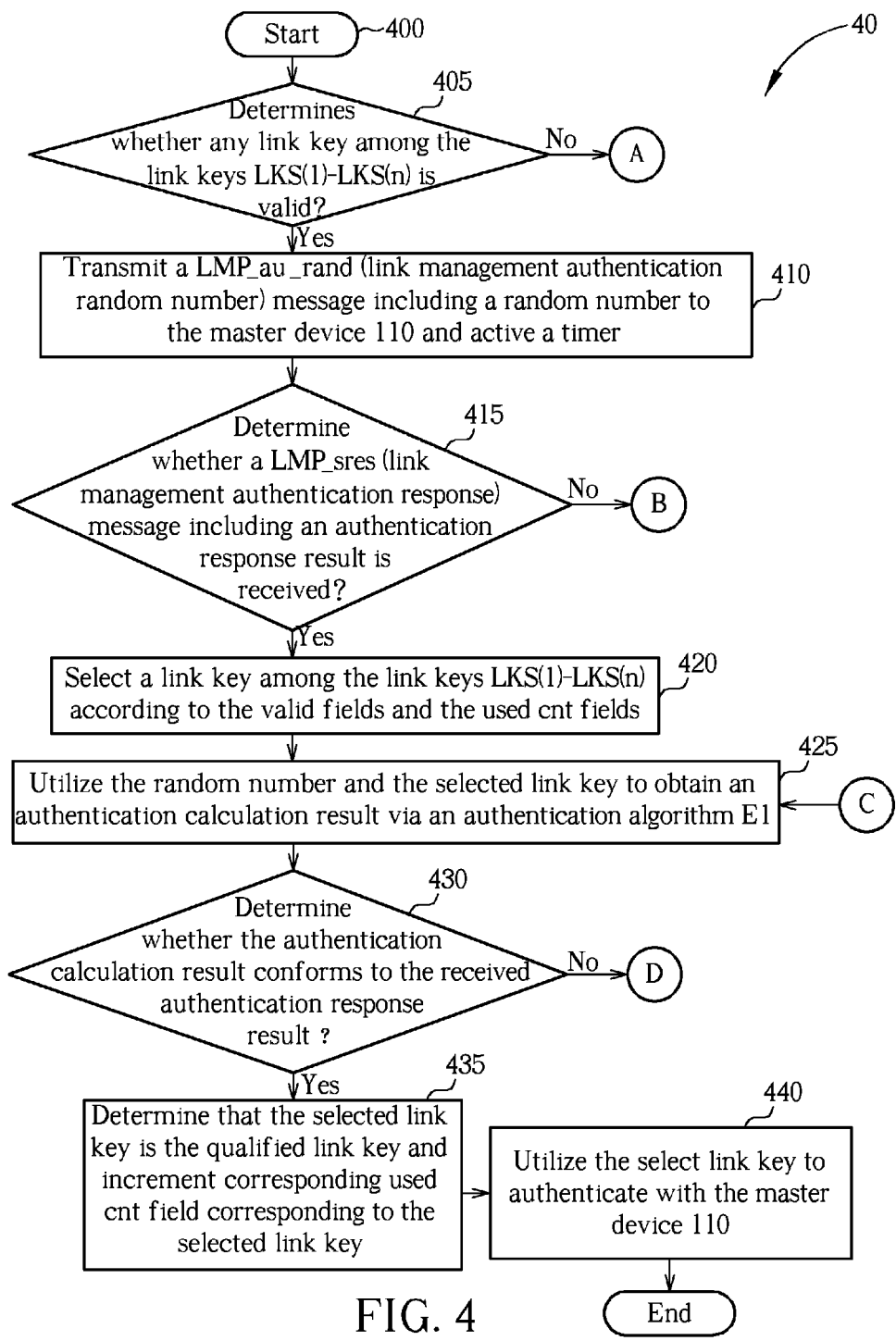
FIG. 4 and FIG. 5 are flowcharts of processes of a searching process according to an example.
Figure 5:
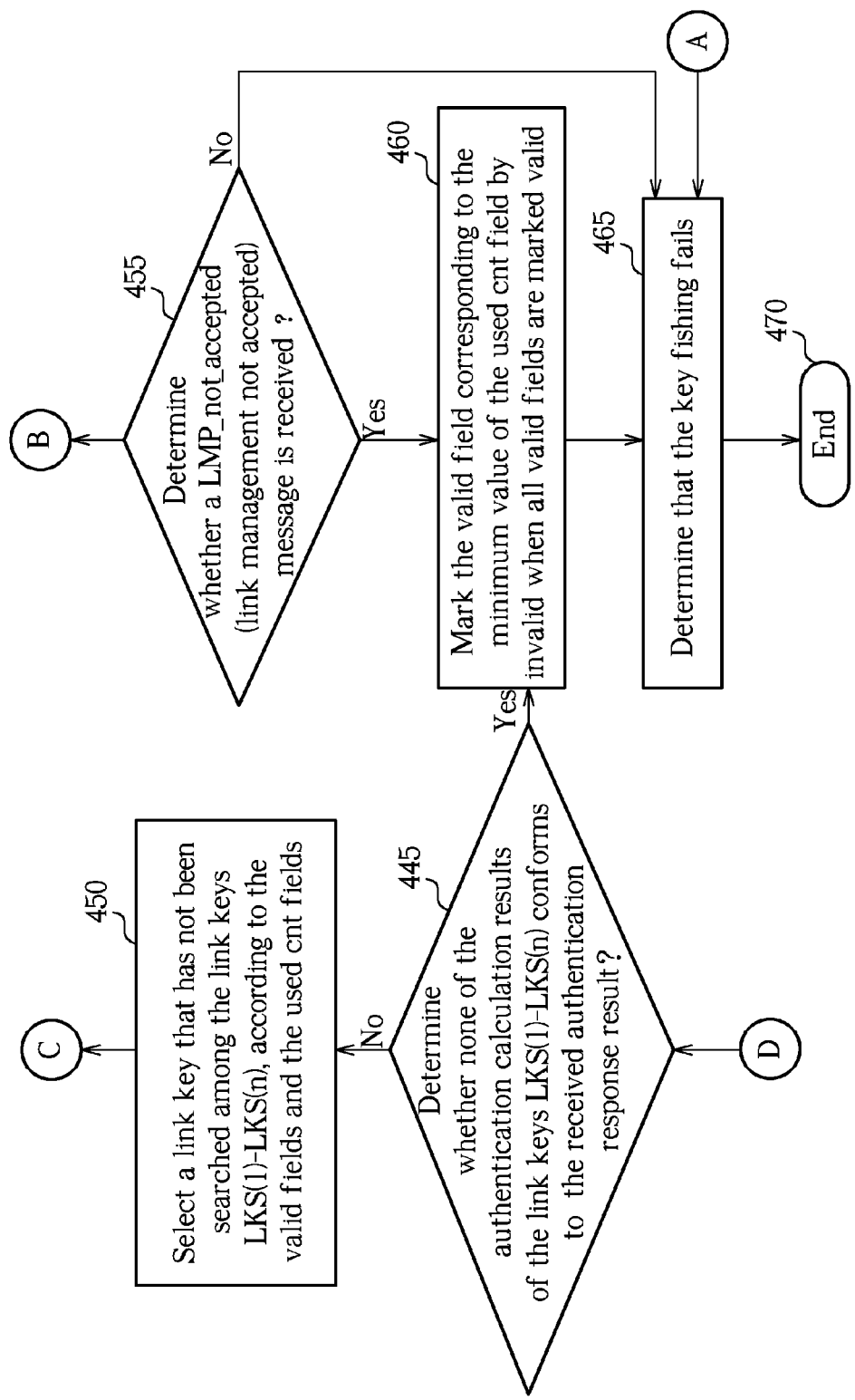

Please refer to FIG. 4 and FIG. 5, which illustrates a flowchart of a searching process 40 according to an embodiment of the present invention. The searching process 40 can be used for an asynchronous connection less (ACL) connection specified by a Bluetooth system established by the active slave device 220 and the master device 110 for searching whether the link key among the link key LKS(1)-LKS(n) is the link key used by the master device 110 (i.e. the qualified link key), wherein the non-volatile memory unit 222 stores the data as the type of the storage format 30. The searching process 40 comprises following steps:

Step 400: Start.
Step 405: Determines whether any link key among the link keys LKS(1)-LKS(n) is valid? If yes, perform the step 410; otherwise, perform the step 465.
Step 410: Transmit a LMP_au_rand (link management authentication random number) message including a random number to the master device 110 and active a timer.
Step 415: Determine whether a LMP_sres (link management authentication response) message including an authentication response result is received? If yes, perform the step 420; otherwise, perform the step 455.
Step 420: Select a link key among the link keys LKS(1)-LKS(n) according to the "valid" fields and the "used cnt" fields.
Step 425: Utilize the random number and the selected link key to obtain an authentication calculation result via an authentication algorithm E1.
Step 430: Determine whether the authentication calculation result conforms to the received authentication response result? If yes, perform the step 435; otherwise, perform the step 445.
Step 435: Determine that the selected link key is the qualified link key and increment corresponding "used cnt" field corresponding to the selected link key.
Step 440: Utilize the select link key to authenticate with the master device 110 and perform the step 470.
Step 445: Determine whether none of the authentication calculation results of the link keys LKS(1)-LKS(n) conforms to the received authentication response result? If yes, perform the step 460; otherwise, perform the step 450.

Step 450: Select a link key that has not been searched among the link keys LKS(1)-LKS(n), according to the "valid" fields and the "used cnt" fields and perform the step 425.
Step 455: Determine whether a LMP_not_accepted (link management not accepted) message is received? If yes, perform the step 460; otherwise, perform the step 465.
Step 460: Mark the "valid" field corresponding to the minimum value of the "used cnt" field by "invalid" when all "valid" fields are marked "valid".
Step 465: Determine that the key fishing fails.
Step 470: End.

In the process 40, the active slave device 220 and the master device 110 both have the authentication algorithm E1 which produces for determining whether the active slave device 220 has the qualified link key (i.e. determine whether both sides use the same link key) according to the random number and the related link key, wherein the authentication calculation result is produced by the active slave device 220 and the authentication response result is produced by the master device 110. The rule for the active slave device 220 to select the link key in the steps 420 and 450 can refer the description in FIG. 3. According to the process 40, when any authentication calculation result conforms to the authentication response result, it represents that the key fishing succeeds, and the key fishing unit 224 determines the qualified link key exists and increases the count of the successful authentication (i.e. corresponding "used cnt" field). Further, the authentication unit 226 utilizes the qualified link key to authenticate the master device 110 mutually. On the contrary, when none of authentication calculation results of the link keys LKS(1)-LKS(n) conforms to the authentication response result, it represents that the key fishing fails (i.e. the active slave device 220 has no qualified key). In this situation, when all the "valid" fields are marked "valid", the key fishing unit 224 marks the "valid" field corresponding to the minimum value of the "used cnt" field by "invalid". In other words, the key fishing unit 224 sets the less used link key in the non-volatile memory unit 222 as the first priority object for being removed. From the above, the active slave device 220 searches the link keys LKS(1)-LKS(n) continuously until a qualified link key is found or non of the link keys LKS(1)-LKS(n) is determined to be the qualified key.

Further, when at least one link key of the active slave device 220 is valid, the active slave device 220 transmits the LMP_au_rand message to the master device 110 and actives the timer which provides a period of validity for receiving a response from the master device 110. Before the timer expires, when the key fishing unit 224 receives the LMP_sres message, it represents that the master device 110 can obtain the link key from the host 100 and produce the authentication response result successfully. On the contrary, if the key fishing unit 224 does not receive the LMP_sres message, the key fishing unit 224 needs to determine whether the LMP_not_accepted message is received. If the key fishing unit 224 further receives the LMP_not_accepted message, step 460 is then performed. On the contrary, if no LMP_not_accepted message is received, the key fishing unit 224 directly determines that the key fishing fails.

From the above, the searching process 40 utilizes multiple link keys stored by the non-volatile memory unit 222 for "fishing" which link key is currently used by the host 100, so as to achieve the mutual authentication. Thus, when the host 100 reboots and thereby changes to use a previously paired link key, the present invention can find the reused link key by the searching process 40. This can avoid failure of the mutual authentication and also the key re-pairing which takes much time.

Figure 6:
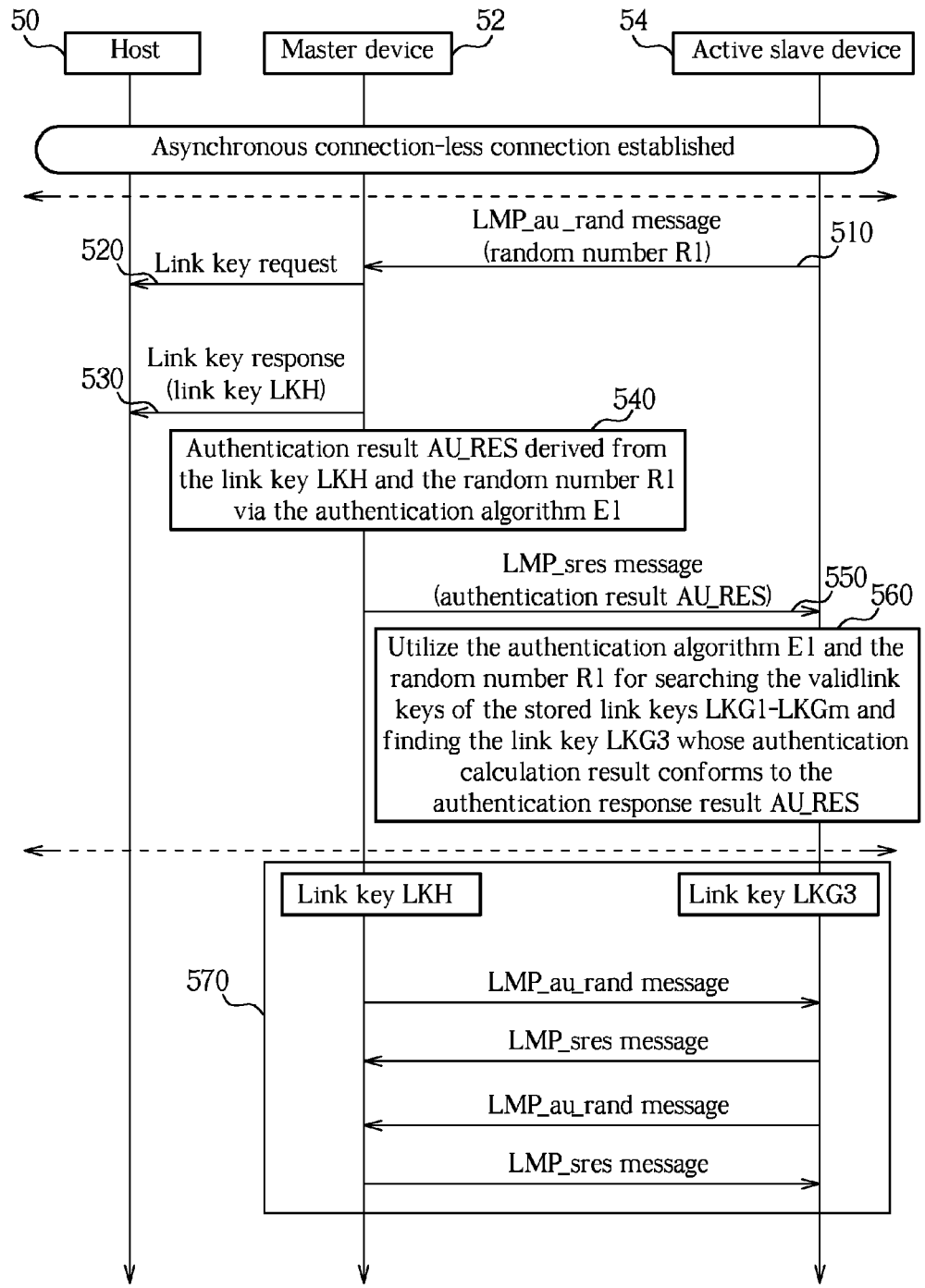
FIG. 6 to FIG. 8 are message exchange sequences about the key fishing according to an example.
Figure 7:
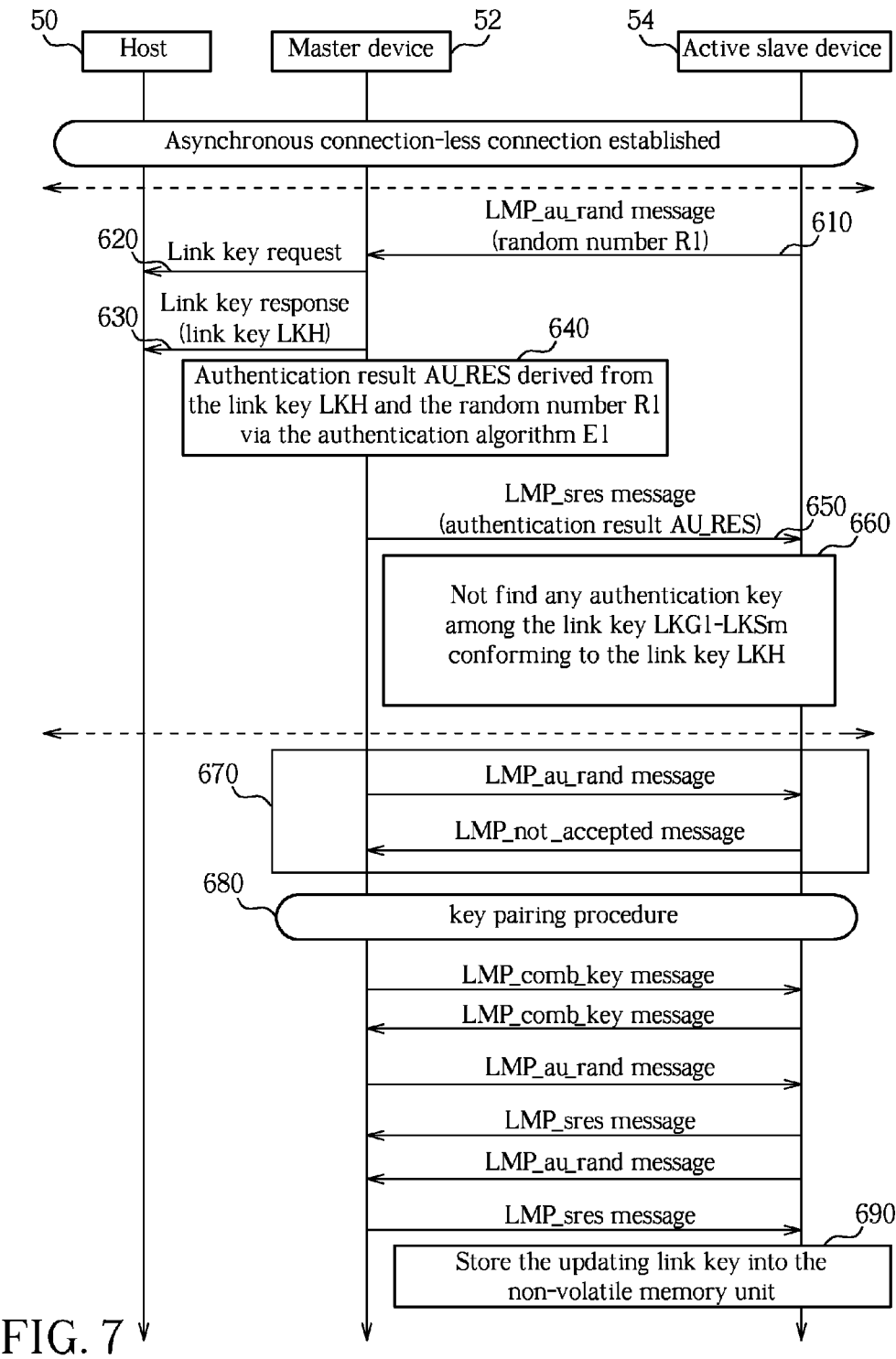
Figure 8:
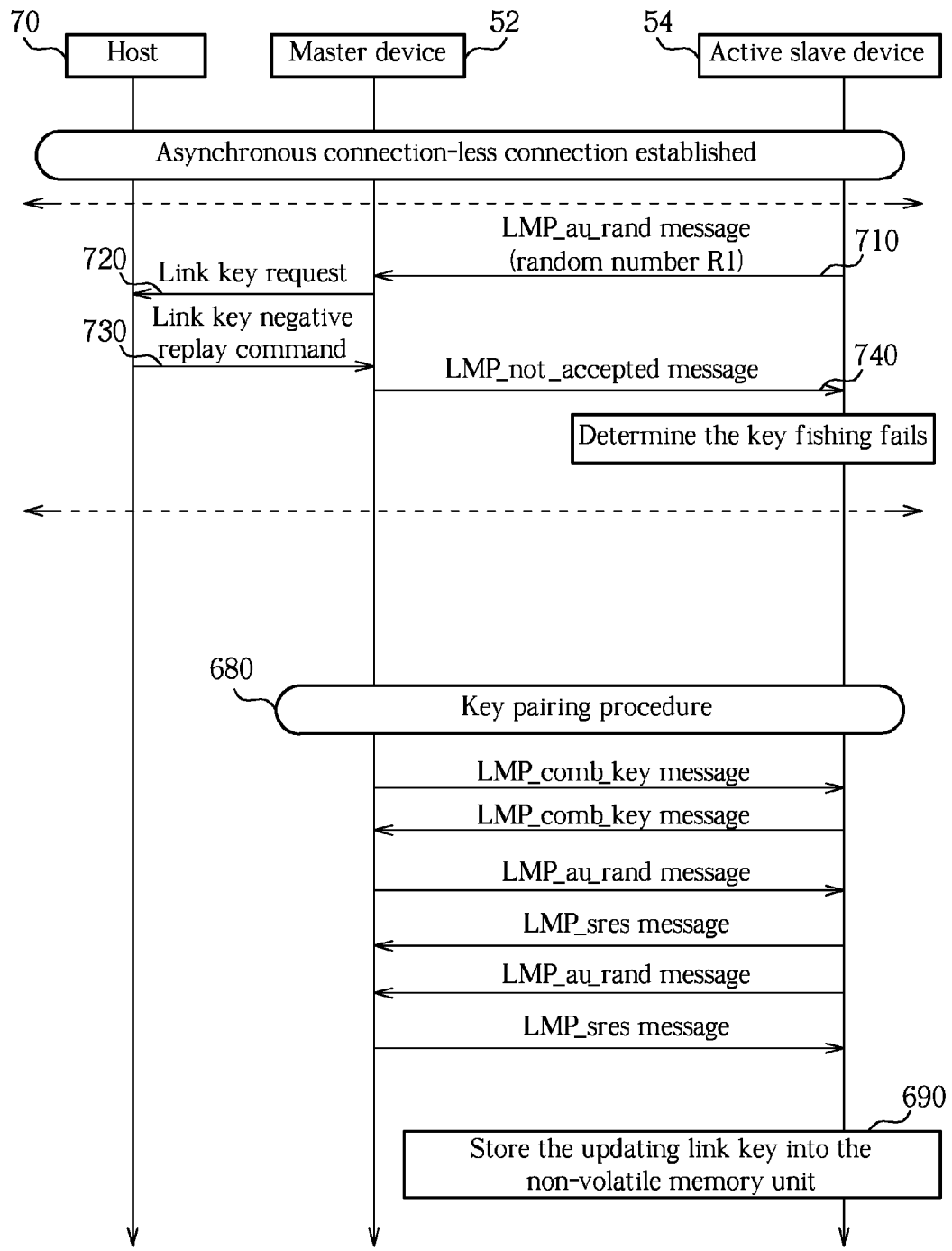

Please refer to FIGS. 6-8, which illustrate a message exchange sequences among a host 50, a master device 52 and an active slave device 54 for the key fishing according to an embodiment of the present invention. FIG. 6 depicts the successful key fishing scenario. After the asynchronous connection-less connection is established among the host 50, the active device 52 and the active slave device 54, the active slave device 54 immediately initiates the authentication procedure which produces a random number R1 and transmits a LMP_au_rand message including the random number R1, as shown in the step 510. After the master device 52 receives the LMP_au_rand message, a link key LKH is obtained from the host 50 in the steps 520 and 530, and then an authentication result AU_RES is derived from the link key LKH and the random number R1 via the authentication algorithm E1 in the step 540. The authentication result AU_RES is transmitted to the active slave device 54 via a LMP_sres message, as shown in the step 550. In the step 560, the active slave device 54 also utilizes the authentication algorithm E1 and the random number R1 for searching the "valid" link keys of the stored link keys LKG1-LKGm and finding the link key LKG3 whose authentication calculation result conforms to the authentication response result AU_RES. In other words, the link key LKG3 is the qualified link key. It represents that the active slave device 54 "fishes" the link key used by the master device 52 successfully. Thus, in the sub-process 570, the active slave device 54 utilizes the link key LKG3 and the master device 52 utilizes the link key LKH can authenticate mutually successfully.

FIG. 7 represents the key fishing failing scenario. The steps 610-650 are similar to the steps 510-550, and therefore, please refer to abovementioned description. In the step 660, the active slave device 54 cannot find any authentication key among the link key LKG1-LKSm conforming to the link key LKH (i.e. no qualified link key exists among the link keys LKG1-LKSm). Thus, in the sub-process 670, the master device 52 utilizes the LMP_au_rand message to request the mutual authentication, but the active slave device 54 utilizes a LMP_not_accepted message to refuse the request due to the failure of the key fishing in the step 660. In this situation, the master device 52 and the active slave device 54 initiate a key pairing procedure 680 which utilizes a LMP_comb_key (link management combined key) message, a LMP_au_rand message and the LMP_sres message to pair the updating link key so as to authenticate mutually. After the mutual authentication succeeds, as shown in the step 690, the active slave device 54 stores the updating link key into the non-volatile memory unit. If all the link keys LKG1-LKSm are the valid keys, the updating link key can replace the less used link key among the link keys LKG1-LKSm.

FIG. 8 represents another key fishing failing scenario. The steps 710-720 are similar to the steps 510-520, and therefore, please refer to abovementioned description. In the step 730, because of no link key in the operating system operated by a host 70, the host 70 responses a link key negative replay command in the step 730, and the master device 52 correspondingly responses the LMP_not_accepted message to inform the active slave device 52 that the authentication request is not accepted, as shown in the step 740. The active slave device 54 immediately determines that no qualified link key exists (i.e. the key fishing fails) and pairs the updating link key, for authenticating with each other and further stores the updating link keys via the sub-process 680 and the step 690.

In conclusion, the non-volatile memory unit in the present invention can store multiple link keys that have ever been paired successfully for each authentication object. In addition, the non-volatile memory unit can store the related key auxiliary information, for example the validity of the link key and the key use frequency etc. The active slave device and related processes of the present invention can search the same link key used by the master device (i.e. the qualified link key) among the link keys. Therefore, when the host changes the link key because of the operating system change, the active slave device of the present invention can reduce the authentication failing probability by the abovementioned key fishing method and thereby avoid the time-consuming key pairing procedure, in order to reduce the whole time and resources for the complete mutual authentication between the master device and the active slave device.

Those skilled in the art will readily observe that numerous modifications and alterations of the device and method may be made while retaining the teachings of the invention.

What is claimed is:

1. An active slave device for a Bluetooth system, the active slave device comprising:
   a non-volatile memory unit for storing a plurality of link keys corresponding to a master device capable of switching among a plurality of operating modes, wherein the plurality of link keys correspond to the plurality of operating modes and are generated by a key pairing procedure performed between the active slave device and the master device when the master device operates in the plurality of operating modes; and
   a key fishing unit for searching whether any of the plurality of link keys conforms to a qualified link key that can enable the active slave device under the current operating mode of the master device without another key pairing procedure performed between the active slave device and the master device;
   wherein the non-volatile memory unit stores the plurality of link keys in a storage format comprising a pairing Bluetooth address field for storing a Bluetooth address that has ever been paired successfully, a link key field for storing one of the plurality of link keys corresponding to the Bluetooth address, and a valid field for representing whether the one corresponding link key is valid, wherein a default value of the one corresponding link key is invalid.

2. The active slave device of claim 1 further comprising an authentication unit for utilizing the qualified link key to authenticate the master device mutually when the key fishing unit indicates that one of the plurality of link keys is found conforming to the qualified link key and for performing the key pairing procedure with the master device for generating an updating link key when the key fishing unit cannot search the qualified link key among the plurality of link keys.

3. The active slave device of claim 2, wherein the non-volatile memory unit stores the updating link key.

4. The active slave device of claim 1, wherein the key fishing unit for searching whether any of the plurality of link keys conforms to the qualified link key executes the following steps:
   transmitting a first message including a random number to the master device;
   receiving a second message corresponding to the first message, wherein the second message includes a first authentication operation result;
   searching whether a second authentication operation result corresponding to the searched link key among the plurality of link keys conforms to the first authentication operation result, wherein each second authentication result is derived from the random number and the searched link key via an authentication algorithm;

determining one of the searched link keys is the qualified link key when the second authentication operation result corresponding to the searched link key conforms to the first authentication operation result; and determining that the key fishing fails when all the second authentication operation results corresponding to the plurality of link keys do not conform to the first authentication result.

5. The active slave device of claim 4, wherein the non-volatile memory unit further stores a plurality of valid pointers corresponding to the plurality of link keys, and the key fishing unit determines validity of the plurality of link keys according to the plurality of valid pointers.

6. The active slave device of claim 5, wherein the key fishing unit transmits the first message to the master device when the key fishing unit determines that at least a link key among the plurality of link keys has validity according to the plurality of valid pointers.

7. The active slave device of claim 5 further comprising an authentication unit for performing the key pairing procedure with the master device for generating an updating link key when the key fishing unit, according to the plurality of valid pointers, determines that none of the link keys has validity or that the key fishing fails.

8. The active slave device of claim 7, wherein the non-volatile memory unit stores the updating link key.

9. The active slave device of claim 1, wherein the non-volatile memory unit further stores a plurality of authentication successful pointers corresponding to the plurality of link keys, and the key fishing unit determines a searching priority sequence of the plurality of link keys according to the plurality of authentication successful pointers.

10. The active slave device of claim 9 further comprising an authentication unit for utilizing the qualified link key to authenticate the master device mutually when the key fishing unit indicates the qualified link key found among the plurality of link keys and for performing the key pairing procedure with the master device for generating an updating link key when the key fishing unit indicates that no qualified link key is found among the plurality of link keys.

11. The active slave device of claim 10, wherein the non-volatile memory unit replaces the link key corresponding to a minimum authentication successful pointer with the updating link key.

12. The active slave device of claim 1, wherein the key fishing unit searches the qualified link key among the plurality of link keys when the key fishing unit and the master device initiate an authentication procedure.

13. The active slave device of claim 12, wherein the authentication procedure is triggered by an operating mode change of the master device, wherein the operating mode change is caused by rebooting of the master device.

14. An authentication method for an active slave device of a Bluetooth system, the authentication method comprising:

storing a plurality of link keys corresponding to a master device in a non-volatile memory unit of the active slave device that the master device is capable of switching among a plurality of operating modes, wherein the plurality of link keys correspond to the plurality of operating modes and are generated by a key pairing procedure performed between the active slave device and the master device when the master device operates in the plurality of operating modes; and searching whether any of the plurality of link keys conforms to a qualified link key that can enable the active slave device under the current operating mode of the master device without another key pairing procedure performed between the active slave device and the master device;

wherein the plurality of link keys are stored in a storage format comprising a pairing Bluetooth address field for storing a Bluetooth address that has ever been paired successfully, a link key field for storing one of the plurality of link keys corresponding to the Bluetooth address, and a valid field for representing whether the one corresponding link key is valid, wherein a default value of the one corresponding link key is invalid.

15. The authentication method of claim 14 further comprising:

utilizing the qualified link key to authenticate the master device mutually when the key fishing unit indicates that one of the plurality of link keys is found conforming to the qualified link key; and performing the key pairing procedure with the master device for generating an updating link key when the key fishing unit can not search the qualified link key among the plurality of link keys.

16. The authentication method of claim 15, wherein the non-volatile memory unit stores the updating link key.

17. The authentication method of claim 14, wherein searching whether any of plurality of link keys conforms to the qualified key executes the following steps:

transmitting a first message including a random number to the master device;

receiving a second message corresponding to the first message, wherein the second message includes a first authentication operation result;

searching whether a second authentication operation result corresponding to the searched link key among the plurality of link keys conforms to the first authentication operation result, wherein each second authentication result is derived from the random number and the searched link key via an authentication algorithm;

determining one of the selected link keys is the qualified key when the second authentication operation result corresponding to the searched link key conforms to the first authentication operation result; and determining that the key fishing fails, when the second authentication operation results corresponding to the plurality of link keys do not conform to the first authentication result.

18. The authentication method of claim 17 further comprising:

storing a plurality of valid pointers corresponding to the plurality of link keys in the non-volatile memory unit; and determining validity of the plurality of link keys according to the plurality of valid pointers.

19. The authentication method of claim 18 further comprising the key fishing unit transmits the first message to the master device when the key fishing unit determines that at least a link key of the plurality link keys has validity according to the plurality of valid pointers.

20. The authentication method of claim 18 further comprising performing the key pairing procedure with the master device for generating an updating link key when the key fishing unit, according to the plurality of valid pointers, determines that none of the link keys has validity or the key fishing fails.

21. The authentication method of claim 20 further comprising storing the updating link key in the non-volatile memory unit.

22. The authentication method of claim 14 further comprising:
   storing a plurality of authentication successful pointers corresponding to the plurality of link keys in the non-volatile memory unit; and
   determining a searching priority sequence of the plurality of link keys according to the plurality of authentication successful pointers.

23. The authentication method of claim 22 further comprising:
   utilizing the qualified link key to authenticate the master device mutually when the key fishing unit indicates the qualified link key found among the plurality of link keys; and
   performing the key pairing procedure with the master device for generating an updating link key when the key fishing unit indicates that no qualified link key is found among the plurality of link keys.

24. The authentication method of claim 23 further comprising the non-volatile memory unit replaces the link key corresponding to a minimum authentication successful pointer with the updating link key.

25. The authentication method of claim 24, wherein searches the qualified link key among the plurality of link keys when the key fishing unit and the master device initiate an authentication procedure.

26. The authentication method of claim 25, wherein the authentication procedure is triggered by an operating mode change of the master device, wherein the operating mode change is caused by rebooting of the master device.

* * * * *